US008995107B2

(12) United States Patent
Chen

(10) Patent No.: US 8,995,107 B2
(45) Date of Patent: Mar. 31, 2015

(54) MODULAR LIGHTNING SURGE PROTECTION APPARATUS

(71) Applicant: Ceramate Technical Co., Ltd., Taoyuan (TW)

(72) Inventor: Hsun-Hua Chen, Taoyuan (TW)

(73) Assignee: Ceramate Technical Co., Ltd., New Taipei (TW)

( * ) Notice: Subject to any disclaimer, the term of this patent is extended or adjusted under 35 U.S.C. 154(b) by 170 days.

(21) Appl. No.: 13/632,821

(22) Filed: Oct. 1, 2012

(65) Prior Publication Data

US 2014/0092514 A1 Apr. 3, 2014

(51) Int. Cl.
*H02H 3/22* (2006.01)
*H01C 7/12* (2006.01)

(52) U.S. Cl.
CPC .................................... *H01C 7/12* (2013.01)
USPC ........................................ 361/118; 361/119

(58) Field of Classification Search
USPC ................................ 361/118, 119; 315/119
See application file for complete search history.

(56) References Cited

U.S. PATENT DOCUMENTS 5,353,189 A * 10/1994 Tomlinson .................... 361/118
5,914,845 A * 6/1999 Chase ........................... 361/111
8,284,536 B2 * 10/2012 Minarczyk et al. ........... 361/118
8,320,094 B2 * 11/2012 Hebibasi et al. .............. 361/119
2004/0174652 A1 * 9/2004 Lewis .......................... 361/118
2006/0056127 A1 * 3/2006 Lewis .......................... 361/118
2007/0159759 A1 * 7/2007 Chen et al. .................... 361/118
2007/0217111 A1 * 9/2007 Tseng .......................... 361/118
2010/0127625 A1 * 5/2010 Minarczyk et al. ........... 315/119
2010/0182727 A1 * 7/2010 Hebibasi et al. .............. 361/118
2011/0109421 A1 * 5/2011 Lee et al. ..................... 337/112
2011/0187552 A1 * 8/2011 Garb ........................ 340/815.45
2014/0071572 A1 * 3/2014 Lin et al. ..................... 361/91.5

* cited by examiner

*Primary Examiner* — Thienvu Tran
*Assistant Examiner* — Angela Brooks
(74) *Attorney, Agent, or Firm* — Muncy, Geissler, Olds & Lowe, P.C.

(57) ABSTRACT

A modular lightning surge protection apparatus is applied to a single-phase three-wire power system with a line, a neutral, and a ground. The modular lightning surge protection apparatus includes a substrate, a surge protection unit, a first temperature fuse, and a second temperature fuse. The surge protection unit has a first surge protection element, a second surge protection element, and a third surge protection element to form a wye connection or a delta connection structure. Furthermore, the surge protection unit, the first temperature fuse, and the second temperature fuse are electrically connected on the substrate to form a small-scale modular circuit integration structure.

14 Claims, 10 Drawing Sheets

MODULAR LIGHTNING SURGE PROTECTION APPARATUS

BACKGROUND

1. Technical Field

The present disclosure relates generally to a lightning surge protection apparatus, and more particularly to a modular lightning surge protection apparatus.

2. Description of Related Art

With science and technology progress, the electric appliance products or the electronic products are increasingly precise. Hence, the surge protection and avoidance have become important topics. There are two main reasons of generating surge: switch surge and lightning surge. The circuit internally generates surge which is mostly associated with the actuation of the circuit components, it is called the switch surge. In addition, the circuit externally generates surge which is indirectly or directly caused by lightning strikes, it is called the lightning surge. Whether the switch surge or lightning surge, the light impact is to cause circuit malfunction and shorten the life of electronic components and the heavy impact is to cause circuit instantly overload and even burned. Therefore, a surge protection mechanism is essential besides the avoidance of generating surge.

Most of the industry commonly use surge prevention components to absorb or release the received surge energy. The more common components are metal oxide varistor (MOV) and gas discharge tube (GDT). The MOV is usually sintered by metal oxides such as zinc oxide and bismuth oxide. The MOV is also referred to as the surge absorber. The surge absorber has the nonlinear characteristics of high resistance value in low voltage and low resistance value in high voltage. In addition, the surge absorbers have different valve resistances according to their different proportion and composition of materials. The resistance of the surge absorber drastically reduces when a voltage difference is greater than the valve resistance, thus causing the massive current flow to inrush. Accordingly, the surge energy can be rapidly brought into the surge absorber so as to protect other electronic components from the surge. The gas discharge tube is internally filled with inert gas for discharging. Also, the surge energy in the GDT is released by the inert gas and converted into the thermal energy. Accordingly, the surge energy can be rapidly brought into the GDT so as to protect other electronic components from the surge.

Reference is made to FIG. 1 which is a perspective schematic view of prior art surge protection element with a coating layer. As mentioned above, the metal oxide varistor is usually used to provide the lightning surge protection. It is assumed that a first metal oxide varistor 101A, a second metal oxide varistor 102A, and a third metal oxide varistor 103A are applied to a single-phase three-wire power system with a line, a neutral, and a ground. Also, the amount of the metal oxide varistor is determined depending on different protection operations of the circuit, but not limited. Especially, each of the metal oxide varistors 101A~103A is coated with a coating layer 111A~113A of epoxy resin material. Also, each of the metal oxide varistors 101A~103A is individually inserted on a printed circuit board (PCB) 30A. Accordingly, the metal oxide varistors 101A~103A and other circuit elements form the lightning surge protection structure. However, the whole printed circuit board 30A (including components mounted thereon) must be discarded and replaced once any one metal oxide varistor is damaged. Hence, the prior art surge protection circuit has the disadvantages of larger occupied space, more complicated manufacturing process, and higher costs.

Accordingly, it is desirable to provide a modular lightning surge protection apparatus to integrate surge protection elements, temperature fuses, and jumper elements to form a small-scale modular circuit integration structure to provide the lightning surge protection.

SUMMARY

An object of the present disclosure is to provide a modular lightning surge protection apparatus to solve the above-mentioned problems. Accordingly, the modular lightning surge protection apparatus is applied to a single-phase three-wire power system with a line, a neutral, and a ground. The modular lightning surge protection apparatus includes a substrate, a surge protection unit, a first temperature fuse, and a second temperature fuse. The surge protection unit has a first surge protection element having a first pin and a second pin, a second surge protection element having a first pin and a second pin, and a third surge protection element having a first pin and a second pin. The second pin of the first surge protection element is connected to the first pin of the second surge protection element and the first pin of the third surge protection element to form a wye connection. The second pin of the third surge protection element is connected to the ground. The first temperature fuse has a first pin and a second pin. The second pin of the first temperature fuse is connected to the first pin of the first surge protection element. The first pin of the first temperature fuse is connected to the line. The second temperature fuse has a first pin and a second pin. The second pin of the second temperature fuse connected to the second pin of the second surge protection element. The first pin of the second temperature fuse is connected to the neutral. The surge protection unit, the first temperature fuse, and the second temperature fuse are electrically connected on the substrate to form a small-scale modular circuit integration structure.

Another object of the present disclosure is to provide a modular lightning surge protection apparatus to solve the above-mentioned problems. Accordingly, the modular lightning surge protection apparatus is applied to a single-phase three-wire power system with a line, a neutral, and a ground. The modular lightning surge protection apparatus includes a substrate, a surge protection unit, a first temperature fuse, and a second temperature fuse. The surge protection unit has a first surge protection element having a first pin and a second pin, a second surge protection element having a first pin and a second pin, and a third surge protection element having a first pin and a second pin. The second pin of the first surge protection element is connected to the first pin of the second surge protection element, the first pin of the first surge protection element is connected to the first pin of the third surge protection element, and the second pin of the second surge protection element is connected to the second pin of the third surge protection element to form a delta connection. The second pin of the first surge protection element is connected to the ground. The first temperature fuse has a first pin and a second pin. The second pin of the first temperature fuse is connected to the first pin of the first surge protection element. The first pin of the first temperature fuse is connected to the line. The second temperature fuse has a first pin and a second pin. The second pin of the second temperature fuse is connected to the second pin of the second surge protection element. The first pin of the second temperature fuse is connected to the neutral. The surge protection unit, the first temperature fuse, and the second temperature fuse are electrically connected on the substrate to form a small-scale modular circuit integration structure.

Further another object of the present disclosure is to provide a modular lightning surge protection apparatus to solve the above-mentioned problems. Accordingly, the modular lightning surge protection apparatus is applied to a single-phase three-wire power system with a line, a neutral, and a ground. The modular lightning surge protection apparatus includes a substrate, a surge protection unit, a first temperature fuse, and a second temperature fuse. The surge protection unit has a first surge protection element, a second surge protection element, and a third surge protection element. The first surge protection element, the second surge protection element, the third surge protection element, the first temperature fuse, and the second temperature fuse are inserted on the substrate to form a small-scale modular circuit integration structure. The first surge protection element, the second surge protection element, and the third surge protection element are electrically connected to each other and the corresponding line, neutral, and ground to form a wye connection or a delta connection.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
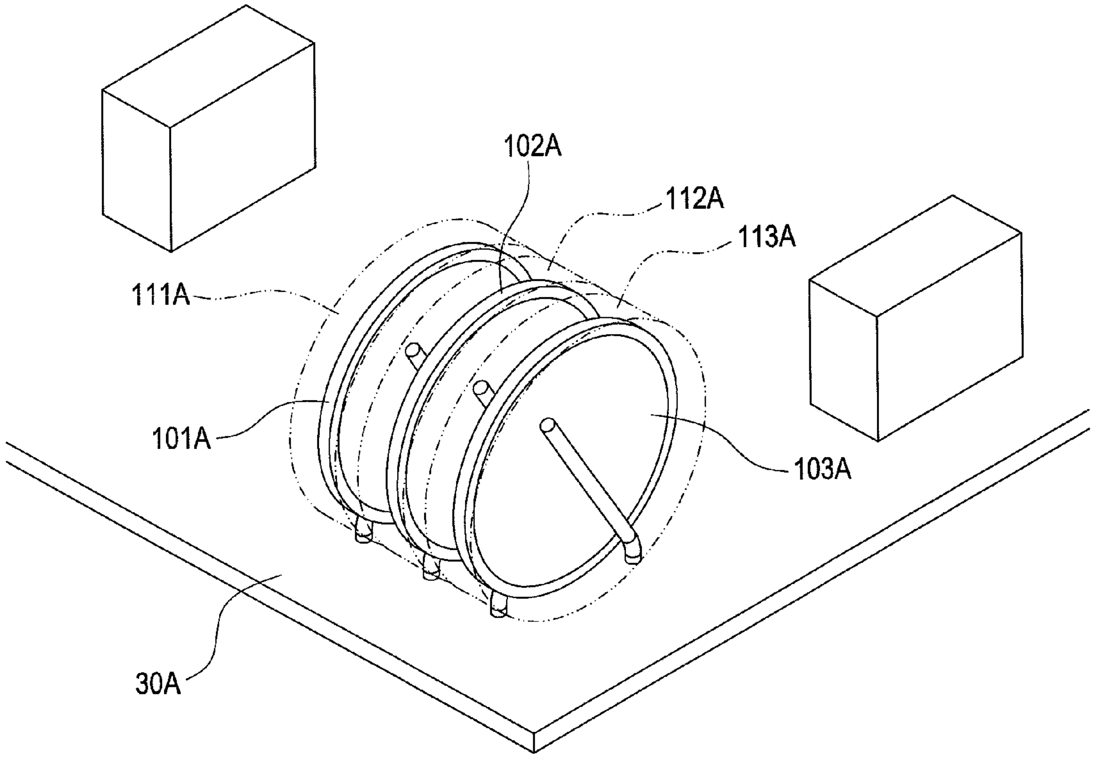
FIG.1 PRIOR ART
FIG. 1 is a perspective schematic view of prior art surge protection element with a coating layer.

Reference will now be made to the drawing figures to describe the present invention in detail.

Figure 2A:
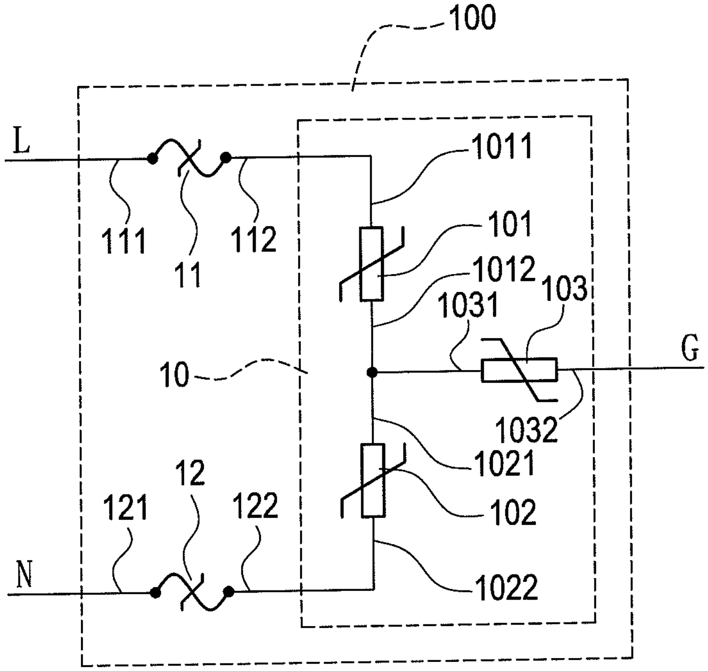
FIG. 2A is a circuit diagram of a modular lightning surge protection apparatus according to a first embodiment of the present disclosure.
Figure 6:
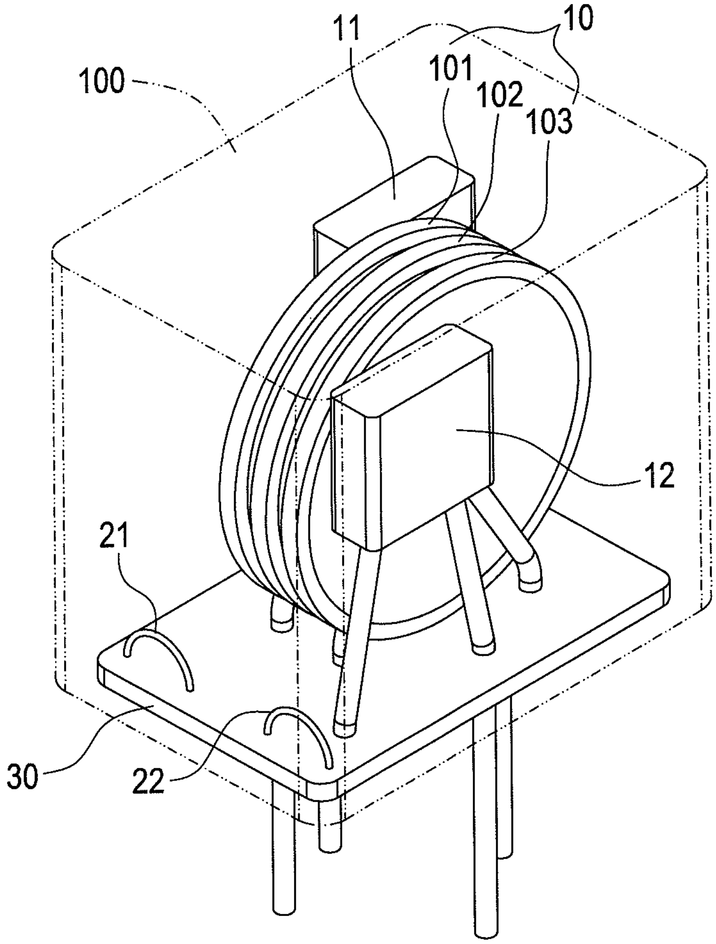
FIG. 6 is a perspective schematic view of the modular lightning surge protection apparatus according to an embodiment of the present disclosure.
Figure 7:
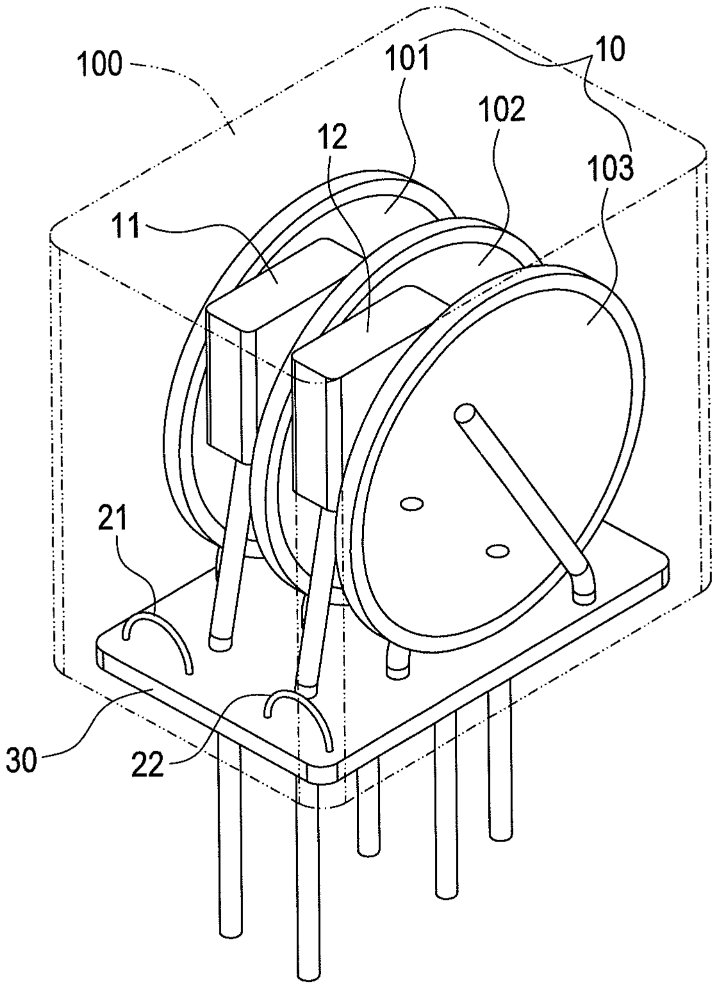
FIG. 7 is a perspective schematic view of the modular lightning surge protection apparatus according to another embodiment of the present disclosure.

Reference is made to FIG. 2A which is a circuit diagram of a modular lightning surge protection apparatus according to a first embodiment of the present disclosure. The modular lightning surge protection apparatus 100 is applied to a single-phase three-wire power system with a line L, a neutral N, and a ground G. The modular lightning surge protection apparatus 100 includes a substrate 30 (as shown in FIG. 6 or FIG. 7), a surge protection unit 10, a first temperature fuse 11, and a second temperature fuse 12. In particular, the substrate 30 can be a printed circuit board (PCB). However, the embodiment is only exemplified but not intended to limit the scope of the disclosure. The surge protection unit 10 has a first surge protection element 101 having a first pin 1011 and a second pin 1012, a second surge protection element 102 having a first pin 1021 and a second pin 1022, and a third surge protection element 103 having a first pin 1031 and a second pin 1032. In particular, the second pin 1012 of the first surge protection element 101 is connected to the first pin 1021 of the second surge protection element 102 and the first pin 1031 of the third surge protection element 103 to form a wye connection. The second pin 1032 of the third surge protection element 103 is connected to the ground G.

The first temperature fuse 11 has a first pin 111 and a second pin 112. The second pin 112 of the first temperature fuse 11 is connected to the first pin 1011 of the first surge protection element 101. The first pin 111 of the first temperature fuse 11 is connected to the line L. The second temperature fuse 12 has a first pin 121 and a second pin 122. The second pin 122 of the second temperature fuse 12 is connected to the second pin 1022 of the second surge protection element 102. The first pin 121 of the second temperature fuse 12 is connected to the neutral N. Especially, the surge protection unit 10, the first temperature fuse 11, and the second temperature fuse 12 are electrically connected on the substrate 30 to form a small-scale modular circuit integration structure.

Figure 2B:
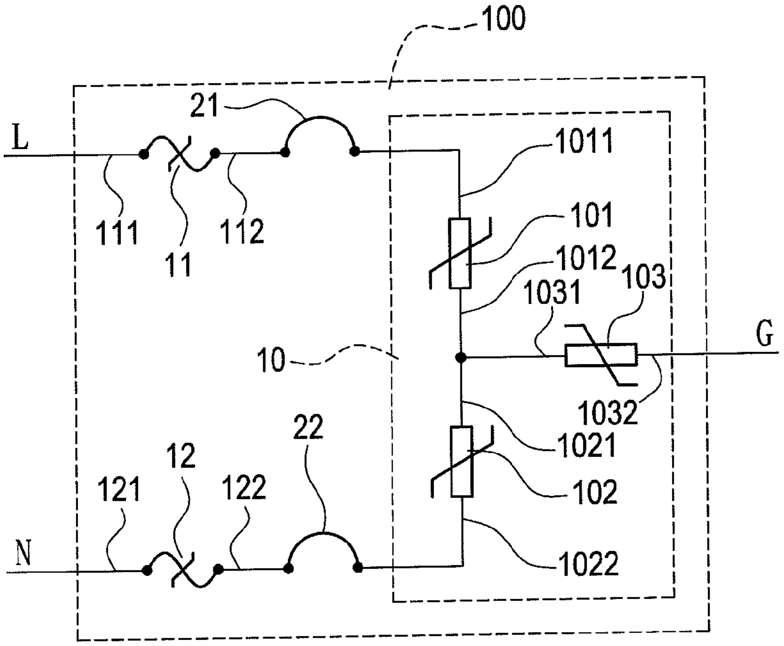
FIG. 2B is a circuit diagram of the modular lightning surge protection apparatus according to a second embodiment of the present disclosure.

Reference is made to FIG. 2B which is a circuit diagram of the modular lightning surge protection apparatus according to a second embodiment of the present disclosure. Comparing with the above-mentioned first embodiment, the modular lightning surge protection apparatus 100 in the second embodiment further includes a first jumper element 21 and a second jumper element 22. The first jumper element 21 is electrically connected between the first surge protection element 101 and the first temperature fuse 11 on the substrate 30, and the second jumper element 22 is electrically connected between the second surge protection element 102 and the second temperature fuse 12 on the substrate 30. In particular, the first jumper element 21 and the second jumper element 22 can be conducting wires or zero-ohm resistors to provide layout connections on the substrate 30.

The detailed operation of the modular lightning surge protection apparatus 100 will be described hereinafter as follows. For convenient explanation, the second embodiment in the FIG. 2B is exemplified for further demonstration. The first surge protection element 101, the second surge protection element 102, and the third surge protection element 103 of the surge protection unit 10 are metal oxide varistors (MOVs), which are also called surge absorbers. That is, the first surge protection element 101 is a first metal oxide varistor, the second surge protection element 102 is a second metal oxide varistor, and the third surge protection element 103 is a third metal oxide varistor, respectively. When a lightning surge occurs between the line L and the neutral N, the first metal oxide varistor 101 or the second metal oxide varistor 102 is in a short-circuit condition to absorb a lightning surge energy, and then the first temperature fuse 11 or the second temperature fuse 12 is in an open-circuit condition to provide a lightning surge protection via cutting off power supply and preventing combustion of the metal oxide varistors 101~103 when the lightning surge energy is converted into a thermal energy to achieve a particular high temperature. In addition, when the lightning surge occurs between the line L and the ground G, the first metal oxide varistor 101 or the third metal oxide varistor 103 is in a short-circuit condition to absorb a lightning surge energy, and then the first temperature fuse 11 is in an open-circuit condition to provide a lightning surge protection via cutting off power supply and preventing combustion of the metal oxide varistors 101~103 when the lightning surge energy is converted into a thermal energy to achieve a particular high temperature. Furthermore, when the lightning surge occurs between the neutral N and the ground G, the second metal oxide varistor 102 or the third metal oxide varistor 103 is in a short-circuit condition to absorb a lightning surge energy, and then the second temperature fuse 12 is in an open-circuit condition to provide a lightning surge protection via cutting off power supply and preventing combustion of the metal oxide varistors 101~103 when the lightning surge energy is converted into a thermal energy to achieve a particular high temperature.

Figure 3A:
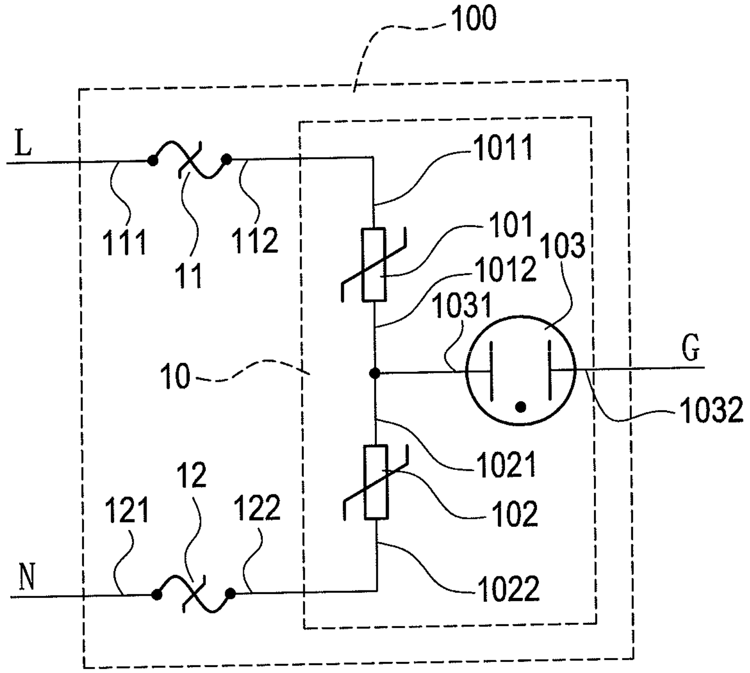
FIG. 3A is a circuit diagram of the modular lightning surge protection apparatus according to a fourth embodiment of the present disclosure.
Figure 3B:
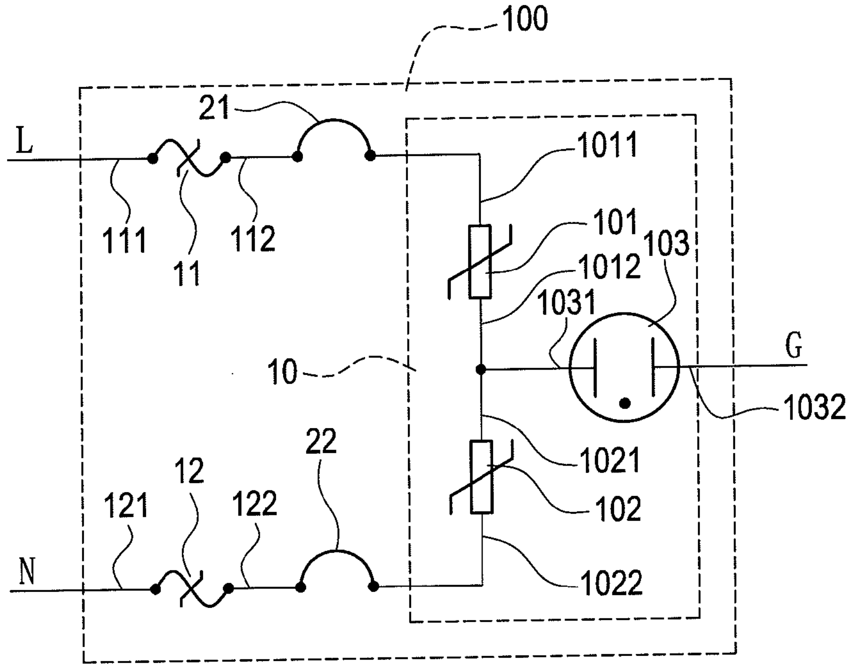
FIG. 3B is a circuit diagram of the modular lightning surge protection apparatus according to a fifth embodiment of the present disclosure.

Reference is made to FIG. 3A and FIG. 3B which are circuit diagrams of the modular lightning surge protection apparatus according to a fourth embodiment and fifth embodiment of the present disclosure, respectively. In particular, the major difference between the fourth embodiment and the above-mentioned first embodiment is that the third surge protection element 103—the metal oxide varistor is replaced by a gas discharge tube (GDT). Similarly, the major difference between the fifth embodiment and the above-mentioned second embodiment is that the third surge protection element 103—the metal oxide varistor is replaced by a gas discharge tube (GDT). For convenient explanation, the fifth embodiment in the FIG. 3B is exemplified for further demonstration. The first surge protection element 101 and the second surge protection element 102 are metal oxide varistors (MOVs) and the third surge protection element 103 is a gas discharge tube (GDT). That is, the first surge protection element 101 is a first metal oxide varistor, the second surge protection element 102 is a second metal oxide varistor, and the third surge protection element 103 is a first gas discharge tube, respectively. When a lightning surge occurs between the line L and the neutral N, the first metal oxide varistor 101 or the second metal oxide varistor 102 is in a short-circuit condition to absorb a lightning surge energy, and then the first temperature fuse 11 or the second temperature fuse 12 is in an open-circuit condition to provide a lightning surge protection via cutting off power supply and preventing combustion of the metal oxide varistors 101~102 and the first gas discharge tube 103 when the lightning surge energy is converted into a thermal energy to achieve a particular high temperature. In addition, when the lightning surge occurs between the line L and the ground G, the first metal oxide varistor 101 or the first gas discharge tube 103 is in a short-circuit condition to absorb a lightning surge energy, and then the first temperature fuse 11 is in an open-circuit condition to provide a lightning surge protection via cutting off power supply and preventing combustion of the metal oxide varistors 101~102 and the first gas discharge tube 103 when the lightning surge energy is converted into a thermal energy to achieve a particular high temperature. Furthermore, when the lightning surge occurs between the neutral N and the ground G, the second metal oxide varistor 102 or the first gas discharge tube 103 is in a short-circuit condition to absorb a lightning surge energy, and then the second temperature fuse 12 is in an open-circuit condition to provide a lightning surge protection via cutting off power supply and preventing combustion of the metal oxide varistors 101~102 and the first gas discharge tube 103 when the lightning surge energy is converted into a thermal energy to achieve a particular high temperature.

Figure 2C:
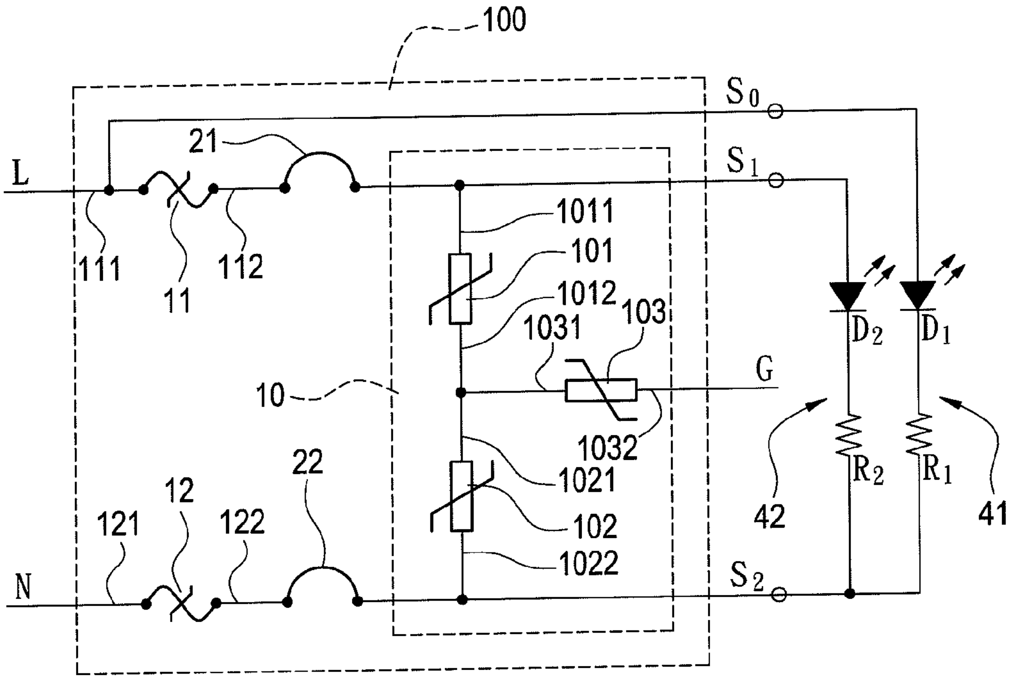
FIG. 2C is a circuit diagram of the modular lightning surge protection apparatus according to a third embodiment of the present disclosure.

Reference is made to FIG. 2C which is a circuit diagram of the modular lightning surge protection apparatus according to a third embodiment of the present disclosure. Comparing with the above-mentioned second embodiment, the modular lightning surge protection apparatus 100 in the third embodiment further includes a signal output main line S0, a first signal output branch line S1, a second signal output branch line S2, a first indicating unit 41, and a second indicating unit 42. The signal output main line S0 is connected to the first pin 111 of the first temperature fuse 11. The first signal output branch line S1 is connected between the first pin 1011 of the first surge protection element 101 and the first jumper element 21. The second signal output branch line S2 is connected between the second pin 1022 of the second surge protection element 102 and the second jumper element 22. The first indicating unit 41 has a first light-emitting diode D1 and a first current-limiting resistor R1 connected in series to the first light-emitting diode D1. The first indicating unit 41 is connected between the signal output main line S0 and the second signal output branch line S2 to indicate that an external power source is normal or abnormal for supplying the modular lightning surge protection apparatus 100. The second indicating unit 42 has a second light-emitting diode D2 and a second current-limiting resistor R2 connected in series to the second light-emitting diode D2. The second indicating unit 42 is connected between the first signal output branch line S1 and the second signal output branch line S2 to indicate that the modular lightning surge protection apparatus 100 is available or unavailable for providing the lightning surge protection. When the external power source can normally supply the modular lightning surge protection apparatus 100, the first light-emitting diode D1 of the first indicating unit 41 provides illumination. On the other hand, the first light-emitting diode D1 of the first indicating unit 41 does not illuminate when the external power source cannot normally supply the modular lightning surge protection apparatus 100. Accordingly, the first indicating unit 41 can indicate that the external power source is normal or abnormal for supplying the modular lightning surge protection apparatus 100. In addition, the second light-emitting diode D2 of the second indicating unit 42 does not illuminate when one of the first temperature fuse 11, the second temperature fuse 12, the first jumper element 21, and the second jumper element 22 is in an open-circuit condition due to cutting off the power supply during the surge protection operation of the modular lightning surge protection apparatus 100. On the other hand, the second light-emitting diode D2 of the second indicating unit 42 provides illumination when all of the first temperature fuse 11, the second temperature fuse 12, the first jumper element 21, and the second jumper element 22 are conductive. Accordingly, the second indicating unit 42 can indicate that the modular lightning surge protection apparatus 100 is available or unavailable for providing the lightning surge protection. However, the embodiments are only exemplified but not intended to limit the scope of the disclosure.

Figure 3C:
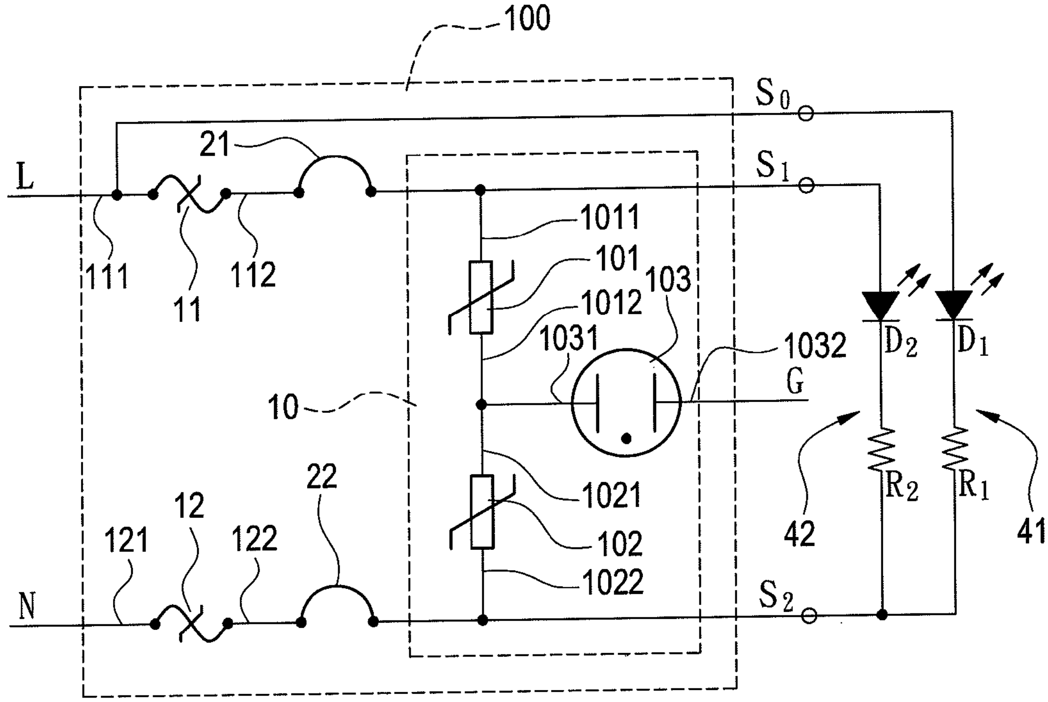
FIG. 3C is a circuit diagram of the modular lightning surge protection apparatus according to a sixth embodiment of the present disclosure.

Reference is made to FIG. 3C which is a circuit diagram of the modular lightning surge protection apparatus according to a sixth embodiment of the present disclosure. Comparing with the above-mentioned third embodiment, the major difference between the sixth embodiment and the above-mentioned third embodiment is that the third surge protection element 103—the metal oxide varistor is replaced by a gas discharge tube (GDT). Similarly, the first indicating unit 41 and the second indicating unit 42 are provided to indicate that the external power source is normal or abnormal for supplying the modular lightning surge protection apparatus 100 and indicate that the modular lightning surge protection apparatus 100 is available or unavailable for providing the lightning surge protection, respectively.

Figure 4A:
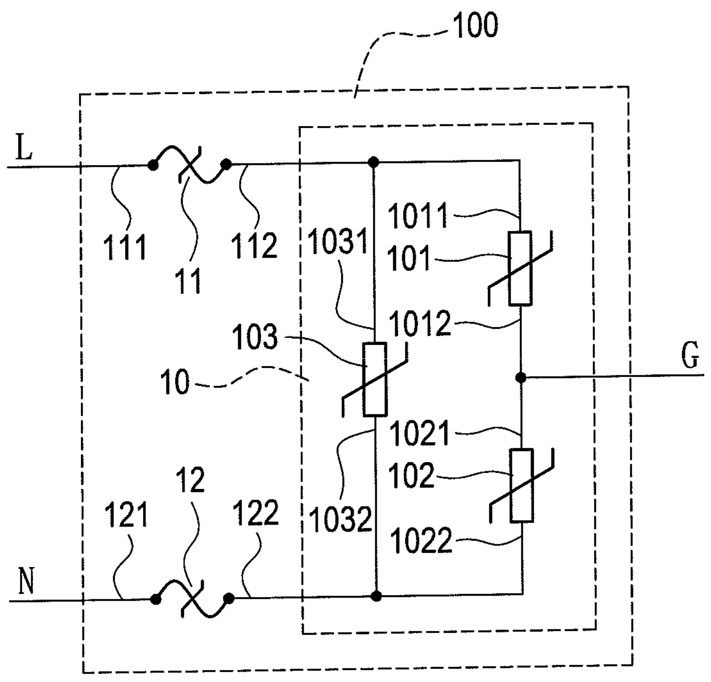
FIG. 4A is a circuit diagram of the modular lightning surge protection apparatus according to a seventh embodiment of the present disclosure.

Reference is made to FIG. 4A which is a circuit diagram of the modular lightning surge protection apparatus according to a seventh embodiment of the present disclosure. The modular lightning surge protection apparatus 100 is applied to a single-phase three-wire power system with a line L, a neutral N, and a ground G. The modular lightning surge protection apparatus 100 includes a substrate 30 (as shown in FIG. 6 or FIG. 7), a surge protection unit 10, a first temperature fuse 11, and a second temperature fuse 12. In particular, the substrate 30 can be a printed circuit board (PCB). However, the embodiment is only exemplified but not intended to limit the scope of the disclosure. The surge protection unit 10 has a first surge protection element 101 having a first pin 1011 and a second pin 1012, a second surge protection element 102 having a first pin 1021 and a second pin 1022, and a third surge protection element 103 having a first pin 1031 and a second pin 1032. In particular, the second pin 1012 of the first surge protection element 101 is connected to the first pin 1021 of the second surge protection element 102, the first pin 1011 of the first surge protection element 101 is connected to the first pin 1031 of the third surge protection element 103, and the second pin 1022 of the second surge protection element 102 is connected to the second pin 1032 of the third surge protection element 103 to form a delta connection. The second pin 1012 of the first surge protection element 101 is connected to the ground G.

The first temperature fuse 11 has a first pin 111 and a second pin 112. The second pin 112 of the first temperature fuse 11 is connected to the first pin 1011 of the first surge protection element 101. The first pin 111 of the first temperature fuse 11 is connected to the line L. The second temperature fuse 12 has a first pin 121 and a second pin 122. The second pin 122 of the second temperature fuse 12 is connected to the second pin 1022 of the second surge protection element 102. The first pin 121 of the second temperature fuse 12 is connected to the neutral N. Especially, the surge protection unit 10, the first temperature fuse 11, and the second temperature fuse 12 are electrically connected on the substrate 30 to form a small-scale modular circuit integration structure.

Figure 4B:
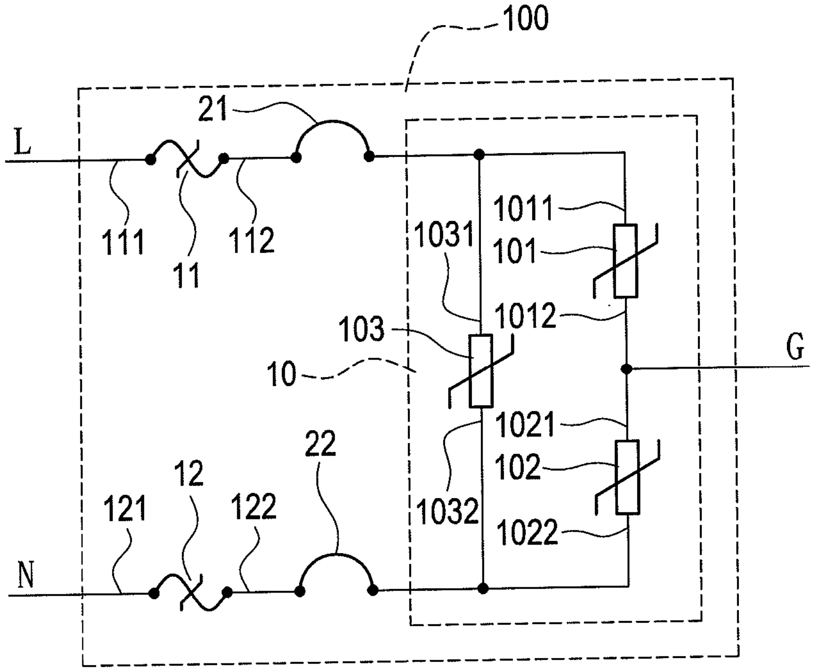
FIG. 4B is a circuit diagram of the modular lightning surge protection apparatus according to an eighth embodiment of the present disclosure.

Reference is made to FIG. 4B which is a circuit diagram of the modular lightning surge protection apparatus according to an eighth embodiment of the present disclosure. Comparing with the above-mentioned seventh embodiment, the modular lightning surge protection apparatus 100 in the seventh embodiment further includes a first jumper element 21 and a second jumper element 22. The first jumper element 21 is electrically connected between the first surge protection element 101 and the first temperature fuse 11 on the substrate 30, and the second jumper element 22 is electrically connected between the second surge protection element 102 and the second temperature fuse 12 on the substrate 30. In particular, the first jumper element 21 and the second jumper element 22 can be conducting wires or zero-ohm resistors to provide layout connections on the substrate 30.

The detailed operation of the modular lightning surge protection apparatus 100 will be described hereinafter as follows. For convenient explanation, the eighth embodiment in the FIG. 4B is exemplified for further demonstration. The first surge protection element 101, the second surge protection element 102, and the third surge protection element 103 of the surge protection unit 10 are metal oxide varistors (MOVs), which are also called surge absorbers. That is, the first surge protection element 101 is a first metal oxide varistor, the second surge protection element 102 is a second metal oxide varistor, and the third surge protection element 103 is a third metal oxide varistor, respectively. When a lightning surge occurs between the line L and the neutral N, the third metal oxide varistor 103 is in a short-circuit condition to absorb a lightning surge energy, and then the first temperature fuse 11 or the second temperature fuse 12 is in an open-circuit condition to provide a lightning surge protection via cutting off power supply and preventing combustion of the metal oxide varistors 101~103 when the lightning surge energy is converted into a thermal energy to achieve a particular high temperature. In addition, when the lightning surge occurs between the line L and the ground G, the first metal oxide varistor 101 is in a short-circuit condition to absorb a lightning surge energy, and then the first temperature fuse 11 or the second temperature fuse 12 is in an open-circuit condition to provide a lightning surge protection via cutting off power supply and preventing combustion of the metal oxide varistors 101~103 when the lightning surge energy is converted into a thermal energy to achieve a particular high temperature. Furthermore, when the lightning surge occurs between the neutral N and the ground G, the second metal oxide varistor 102 is in a short-circuit condition to absorb a lightning surge energy, and then the first temperature fuse 11 or the second temperature fuse 12 is in an open-circuit condition to provide a lightning surge protection via cutting off power supply and preventing combustion of the metal oxide varistors 101~103 when the lightning surge energy is converted into a thermal energy to achieve a particular high temperature.

Figure 4C:
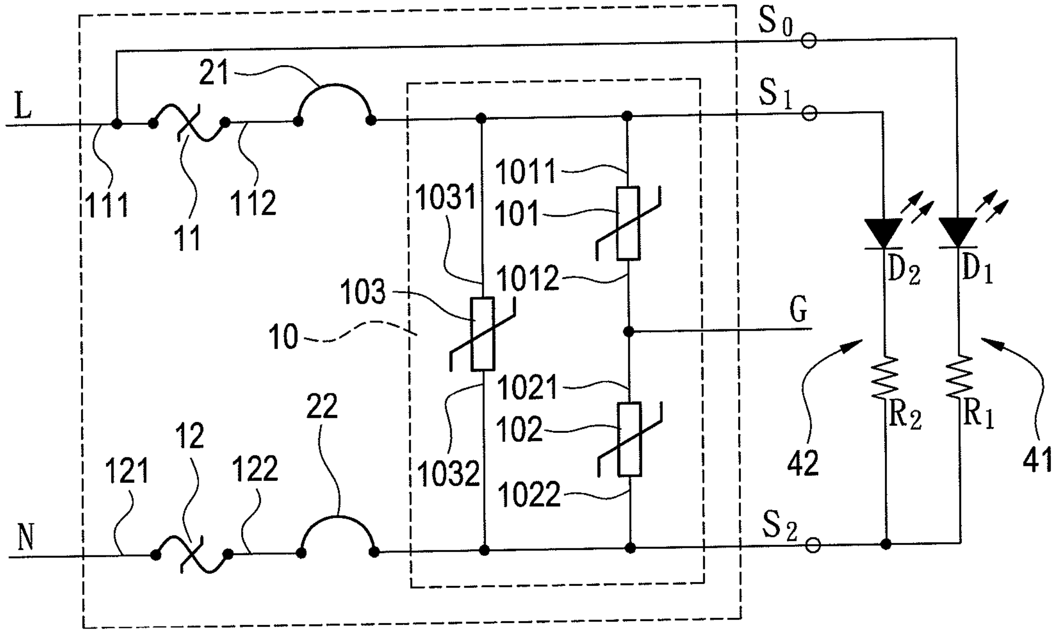
FIG. 4C is a circuit diagram of the modular lightning surge protection apparatus according to a ninth embodiment of the present disclosure.

Reference is made to FIG. 4C which is a circuit diagram of the modular lightning surge protection apparatus according to a ninth embodiment of the present disclosure. Comparing with the above-mentioned eighth embodiment, the modular lightning surge protection apparatus 100 in the ninth embodiment further includes a signal output main line S0, a first signal output branch line S1, a second signal output branch line S2, a first indicating unit 41, and a second indicating unit 42. The signal output main line S0 is connected to the first pin 111 of the first temperature fuse 11. The first signal output branch line S1 is connected between the first pin 1011 of the first surge protection element 101 and the first jumper element 21. The second signal output branch line S2 is connected between the second pin 1022 of the second surge protection element 102 and the second jumper element 22. The first indicating unit 41 has a first light-emitting diode D1 and a first current-limiting resistor R1 connected in series to the first light-emitting diode D1. The first indicating unit 41 is connected between the signal output main line S0 and the second signal output branch line S2 to indicate that an external power source is normal or abnormal for supplying the modular lightning surge protection apparatus 100. The second indicating unit 42 has a second light-emitting diode D2 and a second current-limiting resistor R2 connected in series to the second light-emitting diode D2. The second indicating unit 42 is connected between the first signal output branch line S1 and the second signal output branch line S2 to indicate that the modular lightning surge protection apparatus 100 is available or unavailable for providing the lightning surge protection. When the external power source can normally supply the modular lightning surge protection apparatus 100, the first light-emitting diode D1 of the first indicating unit 41 provides illumination. On the other hand, the first light-emitting diode D1 of the first indicating unit 41 does not illuminate when the external power source cannot normally supply the modular lightning surge protection apparatus 100. Accordingly, the first indicating unit 41 can indicate that the external power source is normal or abnormal for supplying the modular lightning surge protection apparatus 100. In addition, the second light-emitting diode D2 of the second indicating unit 42 does not illuminate when one of the first temperature fuse 11, the second temperature fuse 12, the first jumper element 21, and the second jumper element 22 is in an open-circuit condition due to cutting off the power supply during the surge protection operation of the modular lightning surge protection apparatus 100. On the other hand, the second light-emitting diode D2 of the second indicating unit 42 provides illumination when all of the first temperature fuse 11, the second temperature fuse 12, the first jumper element 21, and the second jumper element 22 are conductive. Accordingly, the second indicating unit 42 can indicate that the modular lightning surge protection apparatus 100 is available or unavailable for providing the lightning surge protection. However, the embodiments are only exemplified but not intended to limit the scope of the disclosure.

Figure 5:
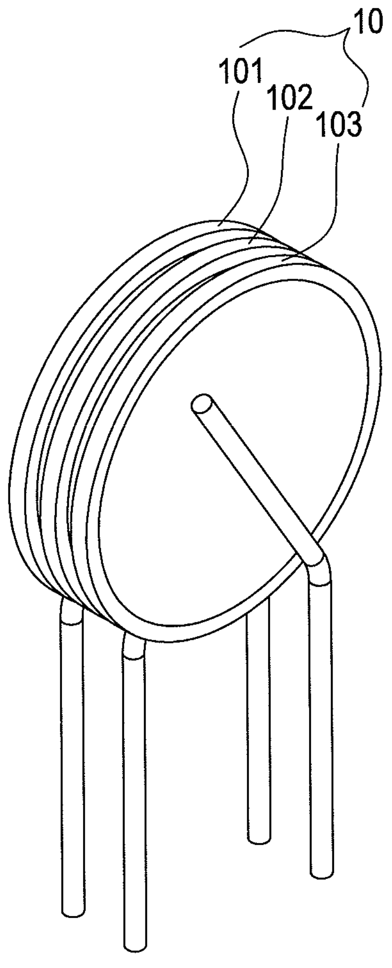
FIG. 5 is an assembled schematic view of a surge protection unit of the modular lightning surge protection apparatus according to the present disclosure.

Reference is made to FIG. 5 which is an assembled schematic view of a surge protection unit of the modular lightning surge protection apparatus according to the present disclosure. For convenient explanation, the first surge protection element 101, the second surge protection element 102, and the third surge protection element 103 of the surge protection unit 10 are metal oxide varistors (MOVs) for further demonstration. Especially, the first surge protection element 101, the second surge protection element 102, and the third surge protection element 103 are adjacently disposed to each other and are insulated by a dispensing process so as to significantly save occupied space, simplify the complexity of the process, and reduce costs.

Reference is made to FIG. 6 which is a perspective schematic view of the modular lightning surge protection apparatus according to an embodiment of the present disclosure. The modular lightning surge protection apparatus 100 is applied to a single-phase three-wire power system with a line L, a neutral N, and a ground G. The modular lightning surge protection apparatus 100 includes a substrate 30, a surge protection unit 10, a first temperature fuse 11, and a second temperature fuse 12. In particular, the substrate 30 can be a printed circuit board (PCB). However, the embodiment is only exemplified but not intended to limit the scope of the disclosure. The surge protection unit 10 has a first surge protection element 101, a second surge protection element 102, and a third surge protection element 103. The first surge protection element 101, the second surge protection element 102, the third surge protection element 103, the first temperature fuse 11, and the second temperature fuse 12 are inserted on the substrate 30. In this embodiment, the first surge protection element 101, the second surge protection element 102, and the third surge protection element 103 are adjacently inserted on the substrate 30 to each other. Also, the first temperature fuse 11 is adjacently disposed to the first surge protection element 101 and the second temperature fuse 12 is adjacently disposed to the third surge protection element 103 to form a small-scale modular circuit integration structure. In particular, the surge protection elements 101~103 are insulated by a dispensing process. In other words, the first surge protection element 101, the second surge protection element 102, and the third surge protection element 103 are disposed between the first temperature fuse 11 and the second temperature fuse 12. The first surge protection element 101, the second surge protection element 102, and the third surge protection element 103 are electrically connected to each other and the corresponding line, neutral, and ground to form a wye connection or a delta connection.

In addition, the modular lightning surge protection apparatus 100 further includes a first jumper element 21 and a second jumper element 22. The first jumper element 21 is inserted on the substrate 30 and electrically connected between the first surge protection element 101 and the first temperature fuse 11. The second jumper element 22 is inserted on the substrate 30 and electrically connected between the second surge protection element 102 and the second temperature fuse 12.

In addition, the first surge protection element 101, the second surge protection element 102, and the third surge protection element 103 of the surge protection unit 10 are metal oxide varistors (MOVs). Also, the first surge protection element 101 and the second surge protection element 102 of the surge protection unit 10 are metal oxide varistors (MOVs) and the third surge protection element 103 of the surge protection unit 10 is a gas discharge tube (GDT).

Furthermore, the modular lightning surge protection apparatus 100 further includes a signal output main line, a first signal output branch line, a second signal output branch line, a first indicating unit, and a second indicating unit. The signal output main line is connected to the first temperature fuse 11. The first signal output branch line is connected between the first surge protection element 101 and the first jumper element 21. The second signal output branch line is connected between the second surge protection element 102 and the second jumper element 22. The first indicating unit has a first light-emitting diode and a first current-limiting resistor connected in series to the first light-emitting diode. The first indicating unit is connected between the signal output main line and the second signal output branch line to indicate that an external power source is normal or abnormal for supplying the modular lightning surge protection apparatus 100. The second indicating unit has a second light-emitting diode and a second current-limiting resistor connected in series to the second light-emitting diode. The second indicating unit is connected between the first signal output branch line and the second signal output branch line to indicate that the modular lightning surge protection apparatus 100 is available or unavailable for providing the lightning surge protection.

Reference is made to FIG. 7 which is a perspective schematic view of the modular lightning surge protection apparatus according to another embodiment of the present disclosure. Comparing with the above-mentioned embodiment, the major difference is that the first temperature fuse 11 is adjacently disposed between the first surge protection element 101 and the second surge protection element 102 and the second temperature fuse 12 is adjacently disposed between the second surge protection element 102 and the third surge protection element 103 to form a small-scale modular circuit integration structure. However, the difference between the two embodiments is previously described, but the rest is the same. Hence, the detail description is omitted here for conciseness.

In conclusion, the present invention has following advantages:

1. The surge protection unit 10, the temperature fuses 11,12, and the jumper elements 21,22 are integrated into a small-scale modular lightning surge protection apparatus 100 which can be simply installed in an electric outlet for providing the lightning surge protection. In addition, when the modular lightning surge protection apparatus 100 is damaged, another new one can be directly installed to provide normally operations after the damaged one is removed;

2. The surge protection elements 101~103 without a coating layer are insulated by a dispensing process so as to significantly save occupied space of the components, simplify the complexity of the process, and reduce costs;

3. The surge protection elements 101~103 are integrated and modularized to reduce resistances between the surge protection elements 101~103 so as to reduce residual voltage across the discharge gap of the surge protection elements 101~103;

4. The modular lightning surge protection apparatus 100 can be directly certificated to reduce the safety certification application fee and application time, thus raising visibility of products and competitiveness of companies;

5. The wye-connected modular lightning surge protection apparatus 100 can use the surge protection elements with withstand voltage reducing by half to reduce thickness of the elements, thus minimizing the modular lightning surge protection apparatus 100;

6. The metal oxide varistor (MOV) in the wye-connected modular lightning surge protection apparatus 100 can be replaced by a gas discharge tube (GDT); and 7. The first indicating unit 41 and the second indicating unit 42 are used to indicate that the external power source is normal or abnormal for supplying the modular lightning surge protection apparatus 100 and indicate that the modular lightning surge protection apparatus 100 is available or unavailable for providing the lightning surge protection, respectively, thus correctly and effectively operating the modular lightning surge protection apparatus 100 for users.

Although the present invention has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A modular lightning surge protection apparatus applied to a single-phase three-wire power system with a line, a neutral, and a ground, the modular lightning surge protection apparatus comprising:

a substrate;

a surge protection unit comprising:

a first surge protection element having a first pin and a second pin;

a second surge protection element having a first pin and a second pin;

a third surge protection element having a first pin and a second pin, wherein the second pin of the first surge protection element is connected to the first pin of the second surge protection element and the first pin of the third surge protection element to form a wye connection, and the second pin of the third surge protection element is connected to the ground;

a first temperature fuse having a first pin and a second pin, and the first pin of the first temperature fuse connected to the line;

a second temperature fuse having a first pin and a second pin, and the first pin of the second temperature fuse connected to the neutral;

a first jumper element electrically connected between the first pin of the first surge protection element and the second pin of the first temperature fuse on the substrate;

a second jumper element electrically connected between the second pin of the second surge protection element and the second pin of the second temperature fuse on the substrate;

a signal output main line connected to the first pin of the first temperature fuse to provide a main signal output terminal;

a first signal output branch line connected between the first pin of the first surge protection element and the first jumper element to provide a first branch signal output terminal;

a second signal output branch line connected between the second pin of the second surge protection element and the second jumper element to provide a second branch signal output terminal;

a first indicating unit having a first light-emitting diode with an anode and a cathode and a first current-limiting resistor with a first terminal and a second terminal; wherein the cathode of the first light-emitting diode is connected in series to the first terminal of first current-limiting resistor; the anode of the first light-emitting diode is connected to the main signal output terminal, and the second terminal of the first current-limiting resistor is connected to the second branch signal output terminal so as to indicate that an external power source is normal or abnormal for supplying the modular lightning surge protection apparatus; and a second indicating unit having a second light-emitting diode with an anode and a cathode and a second current-limiting resistor with a first terminal and a second terminal; wherein the cathode of the second light-emitting diode is connected in series to the first terminal of the second current-limiting resistor; the anode of the second light-emitting diode is connected to the first branch signal output terminal, and the second terminal of the second current-limiting resistor is connected to the second branch signal output terminal so as to indicate that the modular lightning surge protection apparatus is available or unavailable for providing the lightning surge protection;

wherein the surge protection unit, the first temperature fuse, and the second temperature fuse are electrically connected on the substrate to form a small-scale modular circuit integration structure.

2. The modular lightning surge protection apparatus in claim 1, wherein the first surge protection element, the second surge protection element, and the third surge protection element of the surge protection unit are metal oxide varistors (MOVs), namely, a first metal oxide varistor, a second metal oxide varistor, and a third metal oxide varistor, respectively.

3. The modular lightning surge protection apparatus in claim 2, wherein the first metal oxide varistor or the second metal oxide varistor is in a short-circuit condition to absorb a lightning surge energy when a lightning surge occurs between the line and the neutral, and then the first temperature fuse or the second temperature fuse is in an open-circuit condition to provide a lightning surge protection when the lightning surge energy is converted into a thermal energy to achieve a particular high temperature; wherein the first metal oxide varistor or the third metal oxide varistor is in a short-circuit condition to absorb a lightning surge energy when the lightning surge occurs between the line and the ground, and then the first temperature fuse is in an open-circuit condition to provide a lightning surge protection when the lightning surge energy is converted into a thermal energy to achieve a particular high temperature; wherein the second metal oxide varistor or the third metal oxide varistor is in a short-circuit condition to absorb a lightning surge energy when the lightning surge occurs between the neutral and the ground, and then the second temperature fuse is in an open-circuit condition to provide a lightning surge protection when the lightning surge energy is converted into a thermal energy to achieve a particular high temperature.

4. The modular lightning surge protection apparatus in claim 1, wherein the first surge protection element and the second surge protection element of the surge protection unit are metal oxide varistors (MOVs) and the third surge protection element of the surge protection unit is a gas discharge tube (GDT), namely, a first metal oxide varistor, a second metal oxide varistor, and a first gas discharge tube, respectively.

5. The modular lightning surge protection apparatus in claim 4, wherein the first metal oxide varistor or the second metal oxide varistor is in a short-circuit condition to absorb a lightning surge energy when a lightning surge occurs between the line and the neutral, and then the first temperature fuse or the second temperature fuse is in an open-circuit condition to provide a lightning surge protection when the lightning surge energy is converted into a thermal energy to achieve a particular high temperature; wherein the first metal oxide varistor or the first gas discharge tube is in a short-circuit condition to absorb a lightning surge energy when the lightning surge occurs between the line and the ground, and then the first temperature fuse is in an open-circuit condition to provide a lightning surge protection when the lightning surge energy is converted into a thermal energy to achieve a particular high temperature; wherein the second metal oxide varistor or the first gas discharge tube is in a short-circuit condition to absorb a lightning surge energy when the lightning surge occurs between the neutral and the ground, and then the second temperature fuse is in an open-circuit condition to provide a lightning surge protection when the lightning surge energy is converted into a thermal energy to achieve a particular high temperature.

6. A modular lightning surge protection apparatus applied to a single-phase three-wire power system with a line, a neutral, and a ground, the modular lightning surge protection apparatus comprising:

a substrate;

a surge protection unit comprising:

a first surge protection element having a first pin and a second pin;

a second surge protection element having a first pin and a second pin;

a third surge protection element having a first pin and a second pin, wherein the second pin of the first surge protection element is connected to the first pin of the second surge protection element, the first pin of the first surge protection element is connected to the first pin of the third surge protection element, and the second pin of the second surge protection element is connected to the second pin of the third surge protection element to form a delta connection, and the second pin of the first surge protection element is connected to the ground;

a first temperature fuse having a first pin and a second pin, and the first pin of the first temperature fuse connected to the line;

a second temperature fuse having a first pin and a second pin, and the first pin of the second temperature fuse connected to the neutral;

a first jumper element electrically connected between the first pin of the first surge protection element and the second pin of the first temperature fuse on the substrate;

a second jumper element electrically connected between the second pin of the second surge protection element and the second pin of the second temperature fuse on the substrate;

a signal output main line connected to the first pin of the first temperature fuse to provide a main signal output terminal;

a first signal output branch line connected between the first pin of the first surge protection element and the first jumper element to provide a first branch signal output terminal;

a second signal output branch line connected between the second pin of the second surge protection element and the second jumper element to provide a second branch signal output terminal;

a first indicating unit having a first light-emitting diode with an anode and a cathode and a first current-limiting resistor with a first terminal and a second terminal; wherein the cathode of the first light-emitting diode is connected in series to the first terminal of first current-limiting resistor; the anode of the first light-emitting diode is connected to the main signal output terminal, and the second terminal of the first current-limiting resistor is connected to the second branch signal output terminal so as to indicate that an external power source is normal or abnormal for supplying the modular lightning surge protection apparatus; and a second indicating unit having a second light-emitting diode with an anode and a cathode and a second current-limiting resistor with a first terminal and a second terminal; wherein the cathode of the second light-emitting diode is connected in series to the first terminal of the second current-limiting resistor; the anode of the second light-emitting diode is connected to the first branch signal output terminal, and the second terminal of the second current-limiting resistor is connected to the second branch signal output terminal so as to indicate that the modular lightning surge protection apparatus is available or unavailable for providing the lightning surge protection;

wherein the surge protection unit, the first temperature fuse, and the second temperature fuse are electrically connected on the substrate to form a small-scale, modular circuit integration structure.

7. The modular lightning surge protection apparatus in claim 6, wherein the first surge protection element, the second surge protection element, and the third surge protection element of the surge protection unit are metal oxide varistors (MOVs), namely, a first metal oxide varistor, a second metal oxide varistor, and a third metal oxide varistor, respectively.

8. The modular lightning surge protection apparatus in claim 7, wherein the third metal oxide varistor is in a short-circuit condition to absorb a lightning surge energy when a lightning surge occurs between the line and the neutral, and then the first temperature fuse or the second temperature fuse is in an open-circuit condition to provide a lightning surge protection when the lightning surge energy is converted into a thermal energy to achieve a particular high temperature;

wherein the first metal oxide varistor is in a short-circuit condition to absorb a lightning surge energy when the lightning surge occurs between the line and the ground, and then the first temperature fuse or the second temperature fuse is in an open-circuit condition to provide a lightning surge protection when the lightning surge energy is converted into a thermal energy to achieve a particular high temperature; wherein the second metal oxide varistor is in a short-circuit condition to absorb a lightning surge energy when the lightning surge occurs between the neutral and the ground, and then the first temperature fuse or the second temperature fuse is in an open-circuit condition to provide a lightning surge protection when the lightning surge energy is converted into a thermal energy to achieve a particular high temperature.

9. A modular lightning surge protection apparatus applied to a single-phase three-wire power system with a line, a neutral, and a ground, the modular lightning surge protection apparatus comprising:

a substrate;

a surge protection unit comprising a first surge protection element, a second surge protection element, and a third surge protection element;

a first temperature fuse having a first pin and a second pin, and the first pin of the first temperature fuse connected to the line;

a second temperature fuse having a first pin and a second pin, and the first pin of the second temperature fuse connected to the neutral;

a first jumper element electrically connected between the first sin of the first surge protection element and the second pin of the first temperature fuse on the substrate;

a second jumper element electrically connected between the second pin of the second surge protection element and the second pin of the second temperature fuse on the substrate;

a signal output main line connected to the first pin of the first temperature fuse to provide a main signal output terminal;

a first signal output branch line connected between the first pin of the first surge protection element and the first jumper element to provide a first branch signal output terminal;

a second signal output branch line connected between the second pin of the second surge protection element and the second jumper element to provide a second branch signal output terminal;

a first indicating unit having a first light-emitting diode with an anode and a cathode and a first current-limiting resistor with a first terminal and a second terminal; wherein the cathode of the first light-emitting diode is connected in series to the first terminal of first current-limiting resistor; the anode of the first light-emitting diode is connected to the main signal output terminal, and the second terminal of the first current-limiting resistor is connected to the second branch signal output terminal so as to indicate that an external power source is normal or abnormal for supplying the modular lightning surge protection apparatus; and a second indicating unit having a second light-emitting diode with an anode and a cathode and a second current-limiting resistor with a first terminal and a second terminal; wherein the cathode of the second light-emitting diode is connected in series to the first terminal of the second current-limiting resistor; the anode of the second light-emitting diode is connected to the first branch signal output terminal, and the second terminal of the second current-limiting resistor is connected to the second branch signal output terminal so as to indicate that the modular lightning surge protection apparatus is available or unavailable for providing the lightning surge protection;

wherein the first surge protection element, the second surge protection element, the third surge protection element, the first temperature fuse, and the second temperature fuse are inserted on the substrate to form a small-scale modular circuit integration structure; the first surge protection element, the second surge protection element, and the third surge protection element are electrically connected to each other and the corresponding line, neutral, and ground to form a wye connection or a delta connection.

10. The modular lightning surge protection apparatus in claim 9, wherein the first surge protection element, the second surge protection element, and the third surge protection element are adjacently inserted on the substrate, and the first temperature fuse is adjacently disposed to the first surge protection element and the second temperature fuse is adjacently disposed to the third surge protection element to form the small-scale modular circuit integration structure.

11. The modular lightning surge protection apparatus in claim 9, wherein the first temperature fuse is adjacently disposed between the first surge protection element and the second surge protection element and the second temperature fuse is adjacently disposed between the second surge protection element and the third surge protection element to form the small-scale modular circuit integration structure.

12. The modular lightning surge protection apparatus in claim 9, wherein the first surge protection element, the second surge protection element, and the third surge protection element of the surge protection unit are metal oxide varistors (MOVs).

13. The modular lightning surge protection apparatus in claim 9, wherein the first surge protection element and the second surge protection element of the surge protection unit are metal oxide varistors (MOVs) and the third surge protection element of the surge protection unit is a gas discharge tube (GDT).

14. The modular lightning surge protection apparatus in claim 9, wherein the substrate is a printed circuit board (PCB).

* * * * *